United States Patent [19]

Bischlipp et al.

[11] 4,330,919

[45] May 25, 1982

[54] METHOD OF MANUFACTURING A CONNECTING ELEMENT

[75] Inventors: Klaus Bischlipp, Sprockhövel; Jurgen Pfeiffer, Balve, both of Fed. Rep. of Germany

[73] Assignee: Firma Eduard Hueck, Luedenscheid, Fed. Rep. of Germany

[21] Appl. No.: 116,806

[22] Filed: Jan. 30, 1980

[30] Foreign Application Priority Data

Feb. 5, 1979 [DE] Fed. Rep. of Germany ....... 2904192

[51] Int. Cl.[3] ........................ B23P 13/00; E06B 3/26; E04B 2/84

[52] U.S. Cl. .................................. 29/418; 29/155 R; 52/403; 52/731; 49/DIG. 1

[58] Field of Search ..................... 29/418, 416, 155 R; 30/90.8; 52/403, 731; 49/DIG. 1

[56] References Cited

U.S. PATENT DOCUMENTS

| | | | |
|---|---|---|---|
| 3,204,324 | 9/1965 | Nilsen | 29/155 R |
| 3,624,885 | 12/1971 | Holliday et al. | 29/155 R |
| 3,823,524 | 7/1974 | Weinstein | 29/155 R |
| 3,992,769 | 11/1976 | Jackson | 29/418 |
| 4,069,631 | 1/1978 | Nahr | 49/DIG. 1 |
| 4,096,678 | 6/1978 | Diels et al. | 52/403 |
| 4,128,934 | 12/1978 | Doring | 52/730 |
| 4,185,439 | 1/1980 | Bischlipp et al. | 29/418 |

FOREIGN PATENT DOCUMENTS

| | | |
|---|---|---|
| 202330 | 3/1959 | Austria . |
| 1174483 | 7/1966 | Fed. Rep. of Germany . |
| 2033442 | 6/1974 | Fed. Rep. of Germany . |
| 2531221 | 2/1977 | Fed. Rep. of Germany . |
| 2604670 | 8/1977 | Fed. Rep. of Germany . |
| 2801149 | 7/1979 | Fed. Rep. of Germany . |
| 1347275 | 2/1974 | United Kingdom . |

*Primary Examiner*—Daniel C. Crane

*Attorney, Agent, or Firm*—Michael J. Striker

[57] ABSTRACT

A connecting element is manufactured, which has two elongated profiled members bounding with one another a channel and provided with at least two separating members which subdivide the channel into an intermediate hollow space and two one-sidedly open sections which are separated from the intermediate space by the separating members forming bottom walls of the sections. A hardenable heat insulating material is supplied into the sections of the channel so as to harden and to form the heat insulating inserts separated from the intermediate hollow space by the bottom walls. The metallic profiled members together with the bottom walls form a unitary one-piece profiled element. A tool is inserted into the intermediate hollow space and separates the bottom walls from the remainder portions of the profiled members as well as removes the same from the intermediate hollow space.

14 Claims, 7 Drawing Figures

METHOD OF MANUFACTURING A CONNECTING ELEMENT

BACKGROUND OF THE INVENTION

The present invention relates to a method of manufacturing a connecting element, particularly for window and door frames, facade walls and the like.

Connecting elements for window and door frames, facade walls and the like are known in the art. A known connecting element has two metallic profiled members which are spaced from one another and provided with projections, undercuts and the like at their surfaces facing toward one another. Two insulating inserts extend in the direction of elongation of the metallic profiled members, are constituted of heat-insulating material and separated from one another by an intermediate hollow space. Each insulating insert is separated from the intermediate space by a separating member which extends between the metallic profiled members and forms a bottom of a respective one of sections formed in a hollow space between the metallic profiled members. In order to form the insulating inserts, a thermoplastic synthetic material is poured in castable state into the above-mentioned sections of the hollow spaces between the metallic profiled elements. First of all, the first section of the inner hollow of the connecting element is placed under a casting arrangement and filled with insulating material. When the material is hardened in the first section of the hollow space of the connecting element, it is turned about its longitudinal axis, and then the second section of the hollow space is filled with this material.

One of the known methods is disclosed in the German Auslegungsschrift No. 2 531 221. In accordance with the disclosed method in this patent, two individually extruded metallic profile members serve as an initial element. In order to retain the metallic profiled elements at a distance from one another, separating members of heat insulating material are inserted between the profiled members so that the separating members extend in the direction of elongation of the latter, and the metallic profiled members are prefixed thereby. Each separating member forms a respective bottom of a section which is formed between this bottom and the inner walls of the metallic profiled members. The separating members remain after pouring of the material into the sections of the hollow space and hardening the same, as relinquished parts in the finished connecting element.

Such a method has the essential disadvantage in that for manufacturing the connecting element special auxiliary molds are necessary, in order to fix the metallic profiled members at a distance from one another in their final positions. The reason for this is that the prefixing attained by the separating members does not provide in practice for high accuracy of size of the connecting element, because substantial play is necessary for inserting the separating members between the metallic profiled members. In accordance with the known method, the insulating inserts are formed by an insulating foam material which expands in its volume until it hardens. Thereby, precautionary measures must be taken in order to prevent flowing of the insulating material out of the sections of the hollow space during the foaming process.

Another method is disclosed in the German Pat. No. 1 174 483. In accordance with this method, a one piece initial profiled element is utilized, and metallic connection of this profiled element terminates after filling a hollow space with insulating material and hardening of the same, by removing metallic bridges. This profiled element does not require auxiliary forms for its manufacture. However, in accordance with this method it is impossible to manufacture connecting profiled elements in which two or more insulating inserts are provided at a distance from one another. Such a connecting profiled element has the advantage in that it makes possible on economical grounds a wide selection of insulating materials for the insulating inserts, which are available at the market and differ in their heat conductivity, physical properties, casting characteristics, hardening time and so on.

SUMMARY OF THE INVENTION

Accordingly, it is an object of the present invention to provide a method of manufacturing a connecting element which avoids the disadvantages of the prior art.

More particularly, it is an object of the present invention to provide a method of manufacturing a connecting element which can utilize a wider range of insulating materials and provides for an especially simple and economical manufacture of connecting profiled elements in mass production, wherein additional auxiliary molds are no longer needed.

In keeping with these objects and with others which will become apparent hereafter, one feature of the present invention resides, briefly stated, in a method of manufacturing a connecting element in accordance with which a metallic profiled element is formed as a unitary one-piece profiled element with two metallic profiled members and two separating members extending therebetween and forming an intermediate hollow space and two bottoms which bound two sections at one of their sides while the sections are open at their other sides, wherein after filling and hardening of the insulating material in the above-mentioned sections, a tool is inserted into the intermediate hollow space, and the bottom walls one-sidedly bounding the sections are separated from the remainder portions of the profiled members and removed from a hollow space between the latter. It is advantageous when both bottom walls are simultaneously separated and removed. The method according to the present invention provides for a specially economical manufacture of the connecting elements with great cross-sections which can satisfy high requirements with respect to the stability and size accuracy of the connecting elements.

In accordance with a further feature of the present invention, more than two sections of the hollow space between the profiled members can be filled by the insulating material so as to form more than two insulating inserts. In accordance with still another feature of the present invention, the metallic profiled members after pouring the insulating material into the first section of the hollow space, are turned over about 180° so as to make possible pouring the insulating material into the second section. Thereby, the insulating inserts are formed in two planes which extend parallel to one another.

The bottom walls of the above-mentioned sections or insulating inserts can be cut off from the remainder portions of the profiled members. Alternately, the bottom walls can be milled or sawed off from the same. Advantageously, the bottom walls are provided with notches or the like, and then they can be broken along the notches in the region between the metallic profiled members.

In order to further reduce the heat-conductivity between the metallic profiled members, in accordance with a further advantageous feature of the present invention, each insulating insert is provided with through-going recesses which extend transversely to the inserts and are spaced from one another in the longitudinal direction by a predetermined distances. Advantageously the recesses are milled off. They also can be sawed off.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 6:
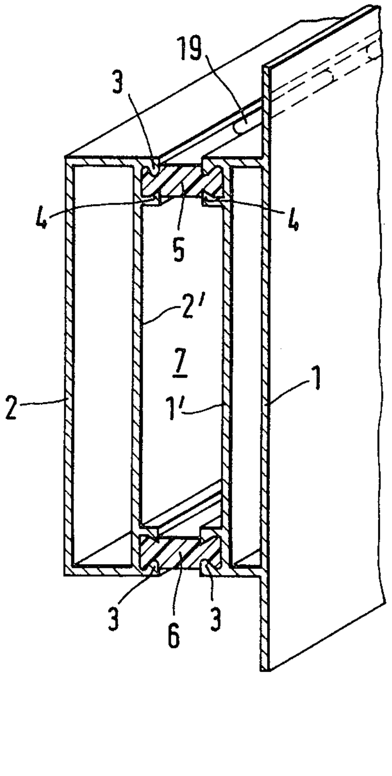
FIG. 6 is the connecting element which is manufactured in accordance with the inventive method.

A connecting profiled element is shown in FIG. 6 and has two profiled members 1 and 2 which are spaced from one another at a predetermined distance. Each metallic profiled member has projections, undercuts and so on 3 and 4, which engage insulating inserts 5 and 6 extending in the direction of elongation of the metallic profiled elements. The insulating inserts are constituted of a material having low heat conductive properties. The insulating inserts form firm connection between the metallic profiled elements.

The insulating inserts extend, in the selected practically advantageous example, parallel to one another. However, they can be inclined relative to one another. The insulating inserts 5 and 6 together with inner walls 1' and 2' of the metallic profiled members 1 and 2, bound a box-shaped intermediate hollow space 7 which extends in the direction of elongation of the metallic profiled members 1 and 2. As can be seen from FIGS. 1–5 which illustrate the stages of the inventive method, the intermediate hollow space 7 is separated over its upper and lower longitudinal sides, from the insulating inserts 5 and 6, respectively, by metallic separating members 8 and 9. The metallic separating members 8 and 9 are extruded together with the metallic profiled members 1 and 2 as a one-piece profiled element. The separating members 8 and 9 form the bottom walls between outwardly open sections 10 and 11. In order to form the insulating inserts, a thermoplastic synthetic material serving as insulating material is poured into the sections 10 and 11.

Figure 1:
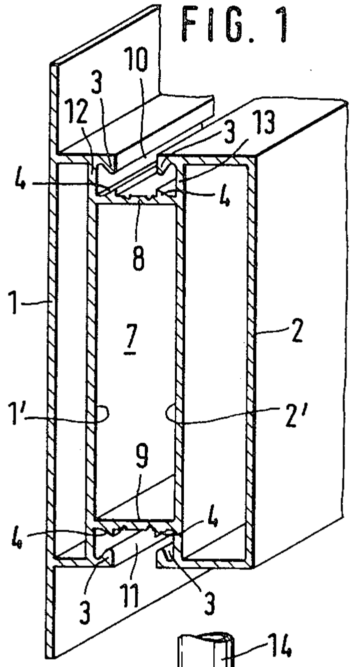
FIGS. 1–5 are views showing successive steps of a method of manufacturing a connecting element, in accordance with the present invention.

The method of manufacture of the connecting profiled element, in accordance with the present invention is performed as follows:

First of all, the metallic profiled members 1 and 2 are formed as a unitary one-piece profiled element, that is together with the separating members which extend between the metallic profiled members 1 and 2 and form the bottom walls of the sections 10 and 11. This initial profiled element is formed by extrusion process. An additional fixing of the metallic profiled members is not necessary (FIG. 1).

Figure 2:
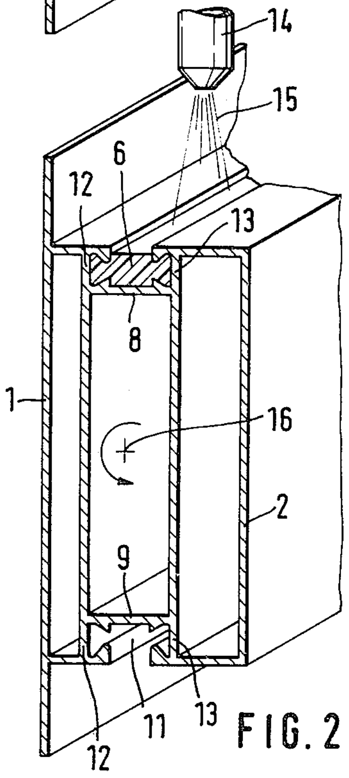

The upper section 10 is bounded between lateral extensions 12 and 13 of the inner walls 1' and 2' of the metallic profiled elements 1 and 2, on the one hand, and the separating member 8 located at the bottom side of the section 10, on the other hand. The initial profiled element is then so placed that its upwardly open section 10 is located below a casting device 14 and filled with insulating material 15 (FIG. 2). When the insulating material is hardened in the section 10, the metallic profiled element is turned about its longitudinal axis 16 so that the section 11 which has been opposite to the casting device 14 assumes now the position below the latter. In other words, the section 18 assumes now the position of the section 10. In the shown example, the metallic profiled element is turned over 180°.

Figure 3:
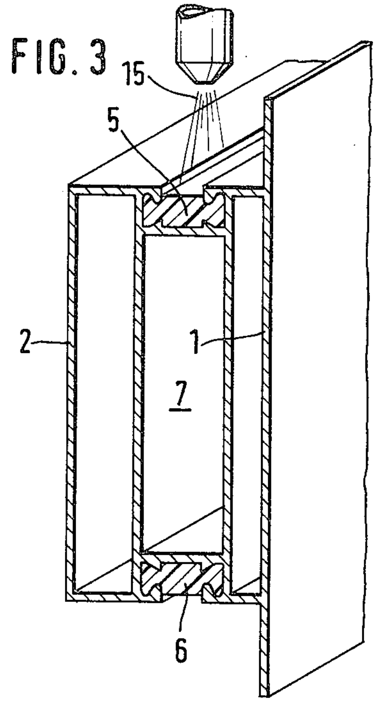

Then, the section 11 is filled with the insulating material 15 supplied from the casting device 14 (FIG. 3). When the insulating material is hardened in the section 11, two insulating inserts 5 and 6 are formed between the elongated profiled members 1 and 2, the inserts being separated from one another by the intermediate hollow space 7 and separated from the latter by the separating members 8 and 9.

Figure 4:
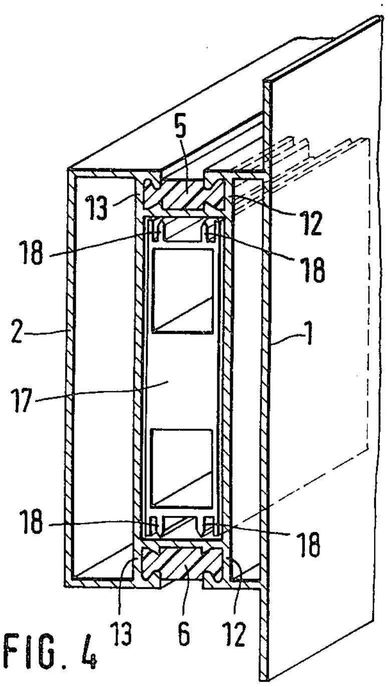

The box-shaped intermediate hollow space 7 has two open ends. A tool which is identified in toto by reference numeral 17 is inserted into the intermediate hollow space 7 through its one end (FIG. 4). The tool 17 has cutting faces 18 formed at its sides which face toward the separating members 8 and 9. Advantageously, the tool 17 is adjustable so as to make possible adjustment of the depth of cut of a cutter 18 into the separating members 8 and 9. The tool 17 can also be formed in another manner which is not shown here.

Figure 5:
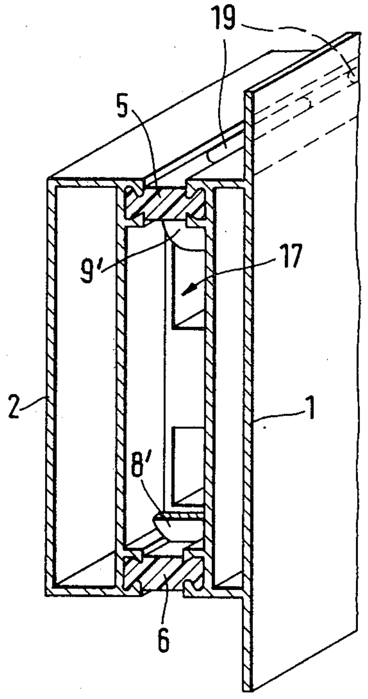

The tool is then pulled or pushed through the box-shaped intermediate hollow space and the cutter 18 penetrates into the separating members 8 and 9 along a predetermined line to such a depth as not to engage the insulating inserts 5 and 6 in order to avoid notch effect (FIG. 5). The rear end of the tool is provided with not shown suitable engaging means which engages initial portions 8' and 9' of the cut bottom walls and pulls the same in the cutting direction out of the intermediate hollow space. The metallic connection between the metallic profiled members 1 and 2 is thereby eliminated. The thus-produced connecting profiled element (FIG. 6) is ready for further working.

In contrast to the method of separation of the bottom walls 8 and 9 described above, the bottom walls can be separated from the profiled members 1 and 2 by milling off or sawing off. They can also be broken down or torn off. In the latter case, the bottom walls may be provided during the manufacture with breakage lines shown in FIG. 1 which for example are pressed in the bottom walls. The bottom walls are then torn or broken along the breakage lines.

In order to further reduce the heat transmission between the metallic profiled members, the insulating inserts 5 and 6 may be provided with recesses 19. These recesses are through-going, extend in a direction transverse to the insulating inserts and are spaced from one another in the direction of elongation of the connecting element. The recesses 19 may be produced by milling, sawing and the like.

Figure 7:
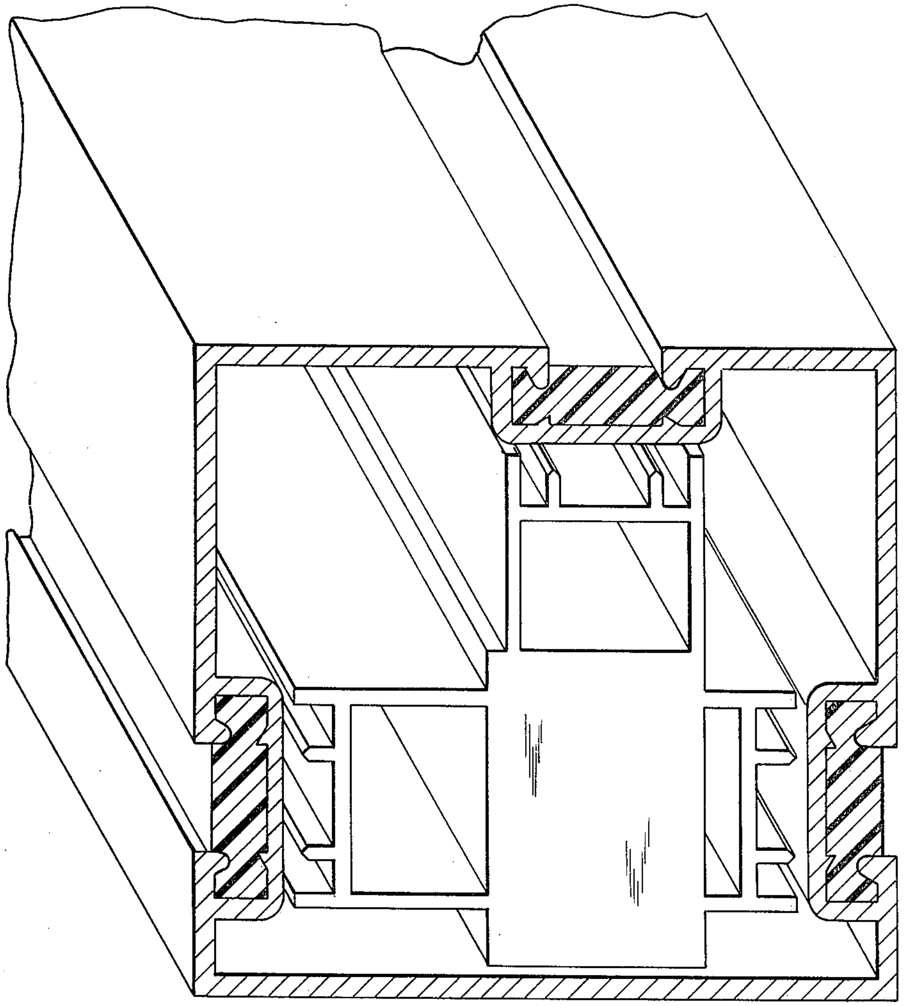
FIG. 7 is the connecting element manufactured by the inventive method, in accordance with a further embodiment of the invention.

More than two such insulating inserts may be manufactured in the connecting profiled element in accordance with the invention, as shown in FIG. 7.

It will be understood that each of the elements described above, or two or more together, may also find a useful application in other types of constructions, differing from the types described above.

While the invention has been illustrated and described as embodied in a method of manufacturing a connecting element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without emitting features that, from the standpoint of prior art, fairly constitute essential characteristics of the generic or specific aspects of this invention.

What is claimed as new and desired to be protected by Letters Patent is set forth in the appended claims.

We claim:

1. A method of manufacturing a connecting element, particularly for window and door frames, facade walls and the like, comprising the steps of providing two elongated profiled members spaced from one another in a first direction transverse to the direction of elongation thereof so as to bound with one another a channel and provided with at least two separating members which are connected with said elongated profiled members and spaced from one another in a second direction transverse to said first direction and to the direction of elongation, so that said separating members subdivide said channel into an intermediate hollow space formed between said separating members, and two sections spaced from one another in said second direction and each located outside of a respective one of said separating members and outwardly opening as considered in said second direction, whereby each of said separating members forms a bottom wall of a respective one of said sections of said channel and separates the same from said intermediate hollow space, said elongated profiled members together with said bottom walls of said sections of said channel forming a unitary profiled element; supplying into said sections of said channel a hardenable heat insulating material so as to fill said sections of said channel; and hardening said material in the latter so as to form in said sections two heat insulating inserts connecting said elongated profiled members with each other, spaced from one another by said intermediate hollow space, and separated from the latter by said bottom walls; inserting into said intermediate hollow space a tool; and separating by said tool said bottom walls of said inserts from the remainder portions of said profiled members so as to remove said bottom walls from said intermediate hollow space, whereupon said profiled members remain connected with one another only by said two heat insulating inserts spaced from one another by said intermediate hollow space.

2. A method as defined in claim 1, wherein said providing step includes forming on said profiled members engaging formations arranged to engage with said heat insulating inserts.

3. A method as defined in claim 1, wherein said supplying step includes utilizing a thermoplastic synthetic material and pouring the same into said sections of said channel in castable state.

4. A method as defined in claim 1, wherein said separating step includes simultaneously separating both said bottom walls.

5. A method as defined in claim 1, wherein said providing step includes forming in said channel more than two such sections, said supplying and hardening step including supplying said material into said more than two sections and hardening said material in the latter.

6. A method as defined in claim 1, wherein said supplying and hardening step includes first pouring said material into one of said sections of said channel, turning said profiled element over approximately 180°, and thereafter pouring said material into the other of said sections of said channel.

7. A method as defined in claim 1, wherein said separating step includes cutting off said bottom walls.

8. A method as defined in claim 1, wherein said separating step includes milling off said bottom walls.

9. A method as defined in claim 1, wherein said separating step includes sawing off said bottom walls.

10. A method as defined in claim 1, wherein said providing step includes forming notches in said bottom walls between said elongated profiled members, said separating step including breaking said bottom walls at said notches.

11. A method as defined in claim 1, wherein said supplying and hardening step includes forming said heat insulating inserts so that they extend in the direction of elongation of said elongated profiled members; and further comprising the step of forming in said insulating inserts a plurality of through-going recesses which are spaced from each other in the direction of elongation by predetermined distances and extend transversely through said heat insulating inserts.

12. A method as defined in claim 11, wherein said step of forming said through-going recesses includes milling off the latter.

13. A method as defined in claim 11, wherein said step of forming said through-going recesses includes sawing off the same.

14. A method as defined in claim 1, wherein said separating step includes performing by said tool simultaneous separating of said bottom walls and withdrawal of the same from said channel.

* * * * *